(12) United States Patent
Jeffryes

(10) Patent No.: US 7,050,356 B2
(45) Date of Patent: May 23, 2006

(54) METHOD OF SEISMIC SURVEYING

(75) Inventor: Benjamin Peter Jeffryes, Histon (GB)

(73) Assignee: Westerngeco L.L.C., Houston, TX (US)

( * ) Notice: Subject to any disclaimer, the term of this patent is extended or adjusted under 35 U.S.C. 154(b) by 110 days.

(21) Appl. No.: 10/403,135

(22) Filed: Mar. 31, 2003

(65) Prior Publication Data

US 2003/0210609 A1 Nov. 13, 2003

(30) Foreign Application Priority Data

Apr. 6, 2002 (GB) .................................. 0207995.2

(51) Int. Cl.
*G01V 1/143* (2006.01)

(52) U.S. Cl. .............................. 367/41; 367/39; 367/40

(58) Field of Classification Search ................... 367/14, 367/23, 39–41

See application file for complete search history.

(56) References Cited

U.S. PATENT DOCUMENTS

| 4,953,657 | A | | 9/1990 | Edington |
| 4,982,374 | A | * | 1/1991 | Edington et al. ............. 367/48 |
| 5,410,517 | A | | 4/1995 | Andersen |
| 5,719,821 | A | | 2/1998 | Sallas et al. |

(Continued)

FOREIGN PATENT DOCUMENTS

GB 2 348 003 B 2/2001

(Continued)

OTHER PUBLICATIONS

Duyndam, Burger and Wasmuth. "Marine production levels in land 3-d seismic."*

(Continued)

*Primary Examiner*—Jack Keith
*Assistant Examiner*—Scott A. Hughes
(74) *Attorney, Agent, or Firm*—Jody Lynn DeStefanis; Steven Gahlings; William L. Wang

(57) ABSTRACT

A method of seismic surveying comprising the steps of actuating the or each vibrator in a first vibrator group at time T0, and subsequently actuating the or each vibrator in a second vibrator group at time T1 that satisfies T0<T1<T0+S1+L where S1 is the sweep time of the first vibrator group and L is the listening time. At least one of the first vibrator group and the second vibrator group comprises at least two vibrators. The first group and the second group of vibrators may be the same group, or they may be different groups. This method enables the time required to complete a seismic survey to be reduced compared to the prior art "simultaneous shooting" and "slip-sweep shooting" techniques.

In a case where the first group and the second group of vibrators are different, the method may further comprise actuating the or each vibrator in the first vibrator group at time T2, where T1<T2<T1+S2+L and S2 is the sweep time of the first vibrator group, and then actuating the or each vibrator in the second vibrator group at time T3 where T2<T3<T2+S1+L and where T3−T2≠T1−T0. The varying time delay between a shot of the first vibrator group and the corresponding shot of the second vibrator group means that harmonic noise will occur at different times in the shot records so that the noise may be eliminated by appropriately combining the shot records.

17 Claims, 8 Drawing Sheets

U.S. PATENT DOCUMENTS

| | | | |
|---|---|---|---|
| 5,721,710 A * | 2/1998 | Sallas et al. | 367/41 |
| 6,366,857 B1 * | 4/2002 | Bird et al. | 702/2 |
| 6,418,079 B1 * | 7/2002 | Fleure | 367/40 |
| 6,519,533 B1 | 2/2003 | Jeffryes | |
| 6,603,707 B1 * | 8/2003 | Meunier et al. | 367/49 |
| 6,704,245 B1 * | 3/2004 | Becquey | 367/39 |
| 6,842,701 B1 * | 1/2005 | Moerig et al. | 702/14 |
| 2002/0067659 A1 * | 6/2002 | Becquey | 367/38 |
| 2002/0091487 A1 * | 7/2002 | Moerig et al. | 702/2 |
| 2003/0163260 A1 * | 8/2003 | Moerig et al. | 702/14 |

FOREIGN PATENT DOCUMENTS

| | | |
|---|---|---|
| GB | 2 359 363 B | 4/2002 |
| WO | 00/57208 A1 | 9/2000 |
| WO | WO 00/72049 A1 * | 11/2000 |
| WO | 01/61379 A2 | 8/2001 |

OTHER PUBLICATIONS

Jeffryes Far—field harmonic measurement for seismic vibrators 66th Annual meeting of the SEG, Nov. 10-15, 1996, Denver, ACQ 3. 1, pp. 60-63.

Rozemond, H J Slip—sweep acquisition 66th Annual meeting of the SEG, Nov. 10-15, 1996, Denver, ACQ 3. 2, pp. 64-67.

P. Ras, M. Daly, G. Baeten Harmonic distortion in slip sweep records SEG Expanded Abstracts 18, 609 (1999).

* cited by examiner

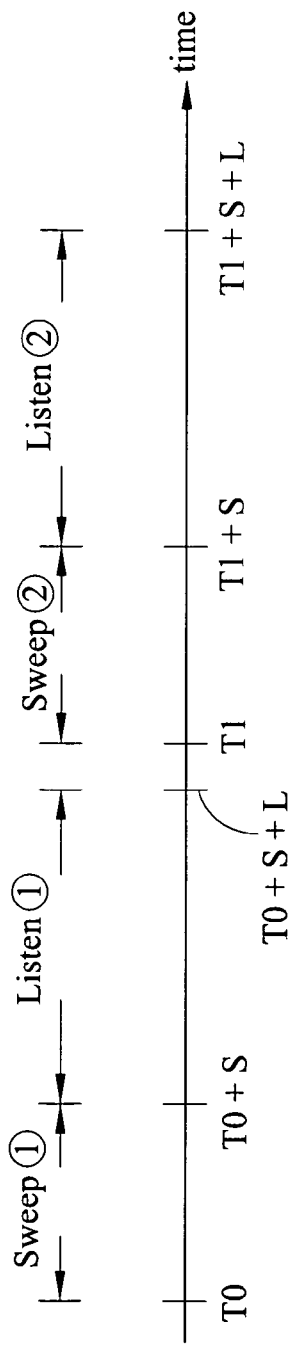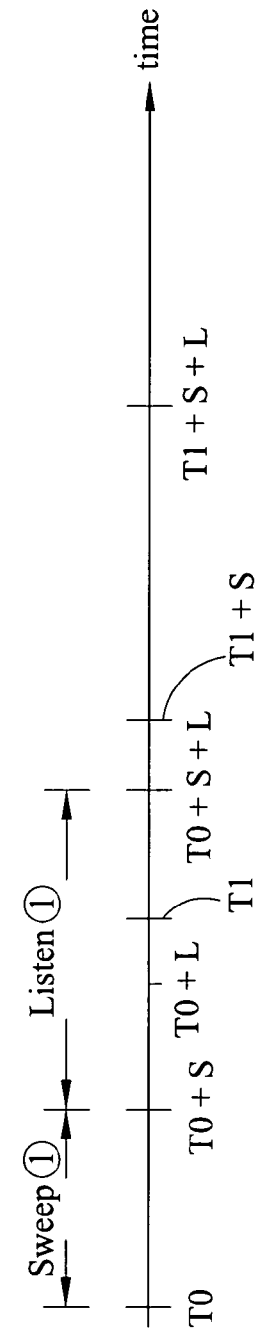

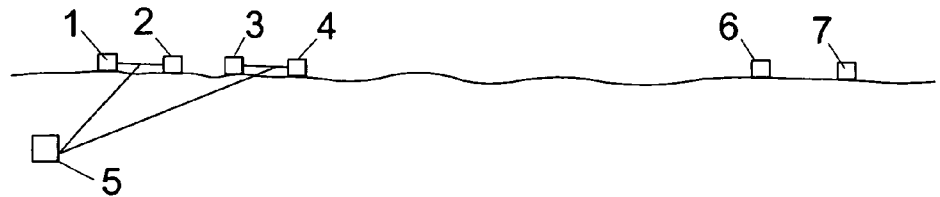
Fig. 9(a)
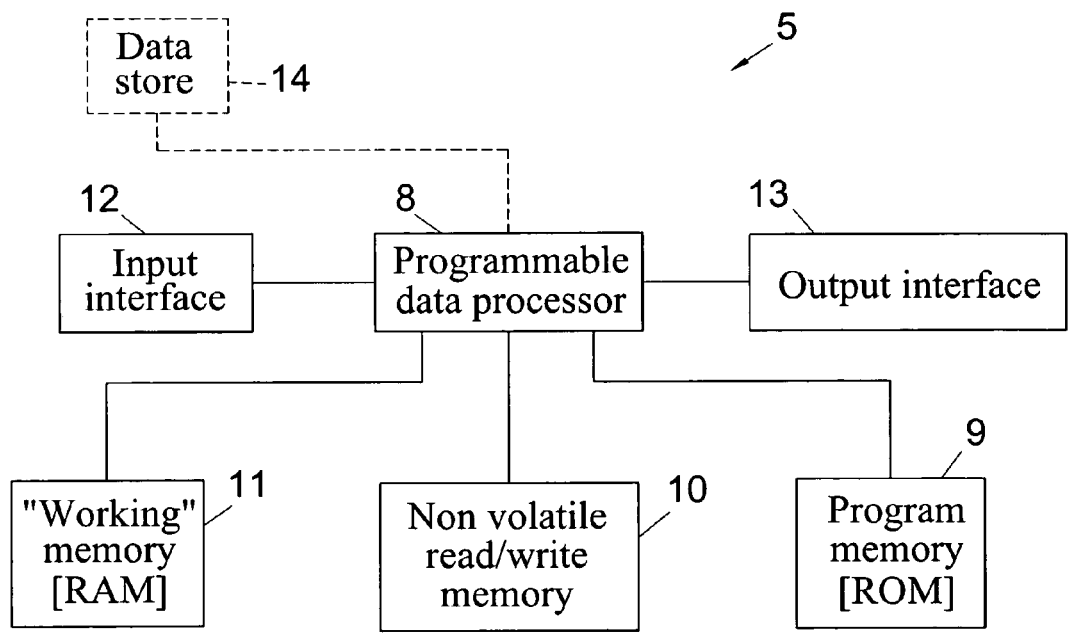
Fig. 9(b)
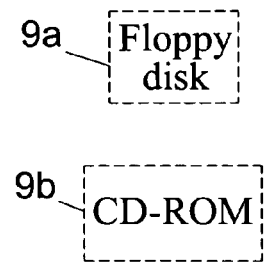

METHOD OF SEISMIC SURVEYING

FIELD OF THE INVENTION

The present invention relates to a method of seismic surveying. In particular, it relates to a method of seismic surveying in which two or more groups of vibrator sources emit seismic energy in such a way that their sweep times overlap with one another.

BACKGROUND OF THE INVENTION

The principle of seismic surveying is that a source of seismic energy is caused to produce seismic energy that propagates downwardly through the earth. The downwardly-propagating seismic energy is reflected by one or more geological structures within the earth that act as partial reflectors of seismic energy. The reflected seismic energy is detected by one or more sensors (generally referred to as "receivers"). It is possible to obtain information about the geological structure of the earth from seismic energy that undergoes reflection within the earth and is subsequently acquired at the receivers.

In practice, a seismic surveying arrangement comprises an array of sources of seismic energy. This is because it is necessary to generate sufficient energy to illuminate structures deep within the earth, and a single seismic source generally cannot do this.

Sources of seismic energy are known which emit seismic energy at more than one frequency. Examples of such seismic sources are vibrator sources, which emit seismic energy in a frequency range of, for example, from 5 or 10 Hz to 100 Hz. When such a vibrator source is actuated, seismic energy is emitted over a finite time period, and the frequency of the emitted energy changes during the period over which seismic energy is emitted. For example, the frequency of the emitted energy may increase monotonically during the period over which seismic energy is emitted. The process of operating a vibrator source of seismic energy to cause emission of seismic energy over the frequency range of the vibrator will be referred to herein as "sweeping" the vibrator, and the step of initiating a vibrator sweep will be referred to as "actuating" the vibrator. Each emission of seismic energy from a vibrator is known as a "shot". The time period over which seismic energy is emitted by the vibrator source will be referred to as the "sweep time", and the "sweep rate" is the rate at which the frequency changes over the sweep time (a linear sweep rate is generally used in practice).

A seismic vibrator source for use on land consists generally of a baseplate in contact with the ground. Seismic energy is transmitted into the ground by applying a vibratory force to the plate, and this is done by applying a control waveform known as a "pilot sweep" to the vibrator control mechanism. The pilot sweep is generally a constant amplitude swept frequency signal, although it tapers off at each end to allow the amplitude of the vibration to be ramped up and down at the start and finish of the sweep respectively. In practice the waveform applied to the ground by the plate is not exactly the same as the pilot waveform; in particular, as well as applying a force at the desired frequency at any particular time (known as the "fundamental frequency"), the vibrator also applies a force at integer multiples of the fundamental frequency (known as "harmonics").

Marine vibrator sources of seismic energy are also known. The are again swept so as to emit seismic energy over a range of frequencies.

When a seismic vibrator source is actuated to emit seismic energy, the seismic energy incident on a receiver is recorded for a pre-determined period from the start of the sweep time of the source. The time from the end of the sweep time to the end of the recording period is generally known as the "listening time", and data is acquired at a receiver from the start of the sweep time to the end of the listening time. The data acquired at a receiver in consequence of actuation of a source is then processed, for example by cross-correlating the acquired data with the pilot sweep of the source to produce a record that is the length of the listening time.

FIG. 1 is a schematic illustration of the process of a conventional seismic survey that uses an array of land vibrator sources. At time T0, one seismic source in the source array is actuated to start its sweep. In this example, the vibrator sweep time has a duration S, and the frequency of seismic energy emitted by the vibrator increases monotonically from a frequency $f_0$ at time T0 to a frequency $f_1$ ($f_1 > f_0$) at the conclusion of the sweep (at time T0+S). The sweep time is followed by the listening time, so that the overall time of the process of actuating and sweeping the source and listening at a receiver for seismic energy is S+L, where L is the duration of the listening time.

In a conventional seismic survey the sources are actuated such that a receiver will receive seismic energy from only one source in any given listening period. The minimum delay between the start of two vibrator sweeps in such a survey is therefore the sum of the sweep time S and the listening time L. The listening time L is made sufficiently large that all seismic energy required at a receiver in a particular listening period was emitted during the sweep time immediately preceding that listening period.

The conventional seismic surveying process has the disadvantage that it can be slow, owing to the need for the minimum time delay between the starts of two vibrator sweeps to be the sum of the sweep time and the listening time. One known attempt to reduce the time required to carry out a seismic survey is the "slip-sweep" acquisition technique. In the slip-sweep technique the minimum time delay between the starts of two subsequent vibrator sweeps is only the listening time, not the sum of the sweep time and the listening time. The record length after cross-correlation is the length of the listening time.

The slip-sweep technique is illustrated in FIG. 2. As in the method of FIG. 1, one seismic source in the source array is actuated to start its sweep at time T0, the vibrator sweep time has a duration S, and the sweep period is followed by a listening time L. The time T1 at which a second source is actuated to start its sweep is not however required to satisfy T1>T0+S+L, but is only required to satisfy T1>T0+L. Since the minimum time delay between actuation of two sources in the slip-sweep technique is only the listening time, not the sum of the sweep time and the listening time, the slip-sweep technique allows the time to complete a seismic survey to be reduced. It has the disadvantage, however, that harmonics of the fundamental frequency generated by one vibrator are present on the seismogram recorded by one or more preceding vibrators.

A further known surveying technique is the technique of "simultaneous shooting". In the simultaneous shooting method two or more seismic sources disposed at respective shot locations are actuated to start their sweeps at the same time. The seismic energy acquired at a receiver will therefore contain events arising from seismic energy emitted by all sources. In order to allow the events corresponding to each source to be separated out from one another, each vibrator must sweep, at its shot location, at least as many times as there are vibrators in the group, and the recorded data are then manipulated algebraically to separate the events corresponding to each source. Typically each vibrator will sweep for the same length of time, at the same sweep rate, and over the same frequency range, but the phase relationship between vibrators changes from one record to another. In the case of a group of two vibrators, for example, one suitable scheme would be for the two vibrators to sweep in phase during the first record and to sweep 180° out of phase during the second record. The mean of the two signals acquired by a receiver gives the signal arising at that receiver from actuation of one vibrator, and half the difference of the two signals acquired by a receiver gives the signal arising at that receiver from actuation of the other vibrator.

SUMMARY OF THE INVENTION

A first aspect of the present invention provides a method of seismic surveying comprising the steps of: actuating the or each vibrator in a first vibrator group at time T0; and actuating the or each vibrator in a second vibrator group at time T1, where T0<T1<T0+S1+L where S1 is the sweep time of the first vibrator group and L is the time during which data is acquired at a receiver; wherein at least one of the first vibrator group and the second vibrator group comprises at least two vibrators.

The present invention provides a method of seismic surveying that combines the known simultaneous acquisition technique and the known slip-sweep acquisition technique. It makes use of the simultaneous acquisition technique in that at least one of the groups of vibrators contains two or more vibrators, but the different groups are swept using a slip-sweep technique. The present invention provides a reduction in the time required to carry out a seismic survey compared to the time required by a conventional slip-sweep technique.

The invention may be applied to a single vibrator group, in which case the second vibrator group is the first vibrator group, or the first and second vibrator groups may be distinct.

In a preferred embodiment the method comprises the step of actuating the or each vibrator group at least as many times as there are vibrators in the respective group and such that the contribution from each vibrator in a group may be determined by algebraic operation on receiver records of sweeps made by the respective group.

In a preferred embodiment T1−T0>(n−1) S1 $f_0/n(f_1-f_0)$, where n is a natural number, $f_0$ is the lower frequency limit of the vibrator sweep and $f_1$ is the upper frequency limit of the vibrator sweep. This enables the noise in the acquired data arising from the $m^{th}$ harmonic of the fundamental frequency to be estimated for all m≦n.

In a preferred embodiment the method comprises the steps of: actuating the or each vibrator in the first vibrator group at time T2, where T1<T2<T1+S2+L where S2 is the sweep time of the second vibrator group; and actuating the or each vibrator in the second vibrator group at time T3 where T2<T3<T2+S+L; the first vibrator group is different from the second vibrator group; and T3−T2≠T1−T0.

This embodiment allows a further noise reduction technique to be applied. The varying time delay between a shot of the first group and the shot of a second group means that harmonic noise will occur at different times in the records of the two shots. The noise may therefore eliminated by appropriately summing the two shot records, on the assumption that each shot record contains the same signal.

A second aspect of the present invention provides a method of seismic surveying comprising the steps of: actuating a first vibrator at time T0; actuating a second vibrator different from the first vibrator at time T1, where T0<T1<T0+S1+L where S1 is the sweep time of the first vibrator and L is the time during which data is acquired at a receiver; actuating the first vibrator at time T2, where T1<T2<T1+S2+L where S2 is the sweep time of the second vibrator; and actuating the second vibrator at time T3 where T2<T3<T2+S1+L and where T3−T2≠T1−T0.

In a preferred embodiment T3−T2>T1−T0.

A third aspect of the present invention provides a seismic surveying arrangement comprising: a plurality of vibrator sources; and a control means adapted to actuate the or each vibrator in a first vibrator group at time T0 and to actuate the or each vibrator in a second vibrator group at time T1, where T0<T1<T0+S1+L where S1 is the sweep time of the first vibrator group and L is the time during which data is acquired at a receiver.

A fourth aspect of the present invention provides a seismic surveying arrangement comprising: a plurality of vibrator sources; and a control means adapted to: (a) actuate a first vibrator at time T0; (b) actuate a second vibrator different from the first vibrator at time T1, where T0<T1<T0+S1+L where S1 is the sweep time of the first vibrator and L is the time during which data is acquired at a receiver; (c) actuate the first vibrator at time T2, where T1<T2<T1+S2+L where S2 is the sweep time of the second vibrator; and (d) actuate the second vibrator at time T3 where T2<T3 <T2+S1+L and where T3−T2≠T1−T0.

In a preferred embodiment the control means comprises a programmable data processor.

A fifth aspect of the invention provides a medium containing a program for the data processor of a seismic surveying arrangement as defined above.

BRIEF DESCRIPTION OF THE DRAWINGS

Preferred embodiments of the present invention will now be described by way of illustrative examples with reference to the accompanying figures in which:

FIG. 1 is a schematic timing diagram of a conventional seismic survey;

FIG. 2 is a schematic timing diagram of a conventional slip-sweep seismic survey;

FIG. 9(*a*) is a schematic diagram of a seismic surveying arrangement according to the present invention; and FIG. 9(*b*) is a schematic diagram of a control means of the seismic surveying arrangement of FIG. 9(*a*).

DETAILED DESCRIPTION OF THE INVENTION

Figure 3:
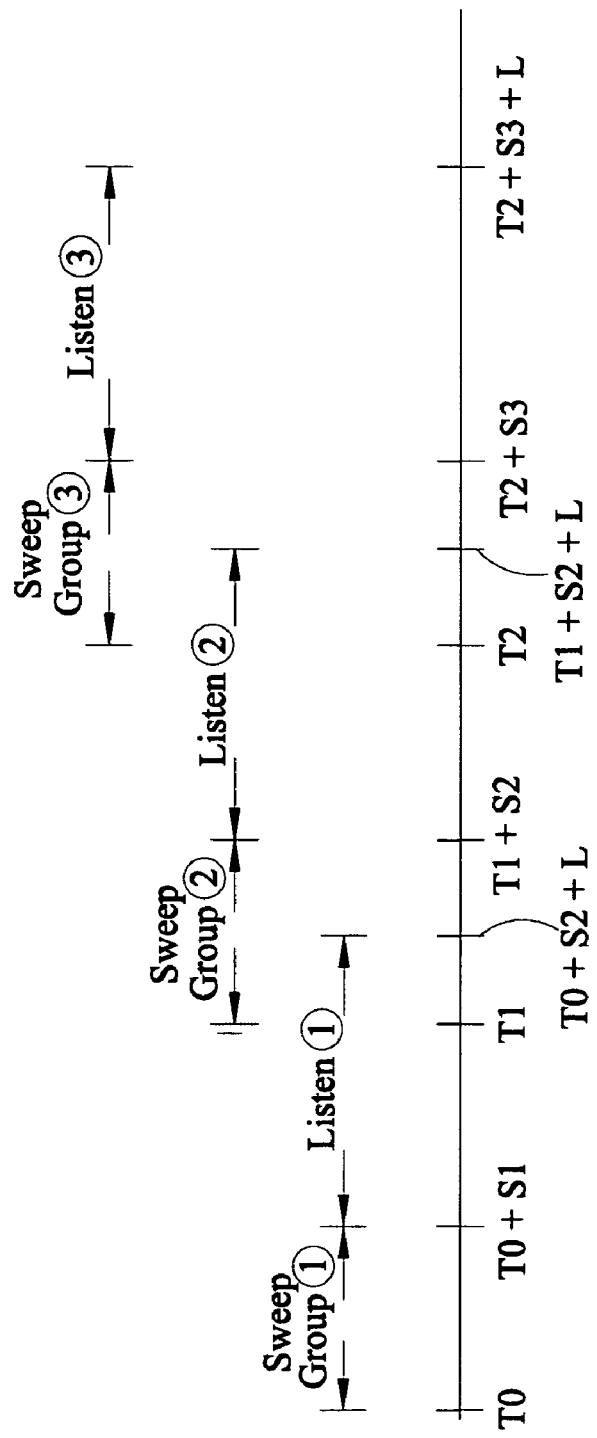
FIG. 3 is a schematic timing diagram of a seismic survey according to a first embodiment of the present invention.

The operation of a seismic surveying arrangement according to a first embodiment of the present invention is illustrated schematically in FIG. 3, which is a timing diagram of the method. This method enables the time taken to complete a seismic survey to be reduced compared to the conventional slip-sweep method described above.

The method assumes that the seismic survey has an array of seismic vibrator sources. In order to carry out the method, the vibrators are grouped into two or more groups, with one group of vibrators being operable independently of the or each other group of vibrators. The grouping may be a physical grouping, for example with the vibrators being arranged in a two-dimensional array with each row or column constituting a group. Alternatively the grouping may be a notional grouping, in which vibrators in an array are notionally divided into two or more groups. It is not necessary for each group to have the same number of vibrators, but at least one group is required to contain two or more vibrators.

At time T0 a first group of vibrators is actuated. That is, each vibrator in the first group starts its sweep at time T0. All vibrators in the first group will have the same sweep time. (For each group, all vibrators in the group will have the sweep time. In principle different groups could have different sweep times, although it is usual for all groups to have the same sweep time as one another.) If the sweep time of the vibrators in the first group is S1, then the sweep period of the first vibrator group lasts from time T0 to time T0+S1. The sweep period for the first group is then followed by a listening time, which has a duration L and so concludes at time T0+S1+L.

A second group of vibrators is actuated to start their sweeps at time T1. The time T1 is before the end of the listening period of the first vibrator group—that is, T1<T0+S1+L. The group of vibrators actuated at time T1 is referred to as a second vibrator group for convenience, but the second vibrator group either could be different from, or could be the same as, the first group of vibrators. The sweep period of the second vibrator group has a duration S2 (which may be equal to S1) and so extends from T1 to T1+S2, and the listening period then extends to T1+S2+L (the two groups will have the same listening time). The time delay between the start of the sweep of the first vibrator group and the start of the sweep of the second vibrator group must exceed the listening time (and if the same group is swept twice in succession then the delay must be greater than the sweep time of that group).

FIG. 3 shows only the first sweep of the first group and the first sweep of the second group. However, the method of the invention requires that each group of vibrators is swept at least as many times are there are vibrators in that group, in a sequence from which the contribution from each vibrator to the seismic data acquired at a receiver can be determined, for example algebraically.

In general, there will be M groups of vibrators, with N vibrators in each group. If each group makes K shots, where K≧N, there will be a sequence of MK shots. For example, if there are two groups of three vibrators (M=2, N=3) each group must make at least 3 shots (K≧3). If each group makes exactly three shots, one possible sequence would be: group 1; group 2; group 1; group 2; group 1; group 2. Some differentiation between the sweeps, for example a phase change, is required to allow the records to be algebraically manipulated to isolate the contribution of each vibrator. (In principle, if a group were to make more shots than there are vibrators in the group (that is, if K>N) some of the shots could be identical provided that there were at least N independent shots.)

As another example, consider a single group of 4 (M=1, N=4). In this case the lowest value of K is 4, so the group must be swept at least 4 times and the shortest possible sequence is: group 1; group 1; group 1; group 1.

As another example, consider six vibrators arranged in three groups each of two vibrators (M=3, N=2). In this case the lowest value of K is 2. If each group makes exactly two shots, one possible sequence would be: group 1; group 2; group 3; group 1; group 2; group 3.

In this method of the invention, at least one of the shots takes place within time S+L of the start of the preceding shot. Preferably, as many as possible of the shots start less than S+L after the previous shot. It will be noted that the very last shot will not contain slip-sweep noise—for example, in the simple example of shooting with just two vibrators, the second vibrator would shoot within the listening time of the first vibrator (that is, within time S+L of the start of the first shot). Both vibrators would then be moved to their next shot points so that the shot of the second vibrator would not have any slip-sweep noise on it.

In the above examples each group of vibrators contains the same number of vibrators. The invention is not limited to this, and the groups need not all contain the same number of vibrators (although that there must be a group containing more than one vibrator). If the groups do not contain the same number of vibrators, each group must be swept at least one more time than there are vibrators in that group.

FIG. 3 indicates that vibrators in a third vibrator group (which could be the first or second group) are actuated to start their sweeps at time T2 that satisfies T2<T1+S2+L, where S2 is the sweep time of the second group of vibrators. It would, however, be possible for the third group to be actuated at a time T2>T1+S2+L since it is necessary for only one shot to start within S+L of the start of the previous shot.

Once each vibrator group has been actuated a sufficient number of times the vibrators may be moved to different positions to allow a fresh survey to be carried out.

The response at each receiver owing to the seismic energy generated by each individual vibrator may be calculated from the seismic energy acquired at the receiver(s) by using any suitable technique. One suitable technique is disclosed in UK patent application No. 2 359 363. In principle the response could be calculated immediately the data have been acquired, but it is more usual for the data to be stored, for example on magnetic tape or disc, for subsequent processing away from the survey location.

One problem with slip-sweep acquisition is that the data obtained in the listening period following one sweep will contain harmonic noise that arises from the subsequent sweep. It is desirable to eliminate this harmonic noise during processing of the data. A further embodiment of the present invention provides a method for estimating the harmonic noise in data acquired in a listening period from the acquired data.

The harmonic noise in data acquired in one listening period is the earth's response to the harmonic output from the subsequent sweep. The earth's response for the harmonics of the subsequent shot is the same as the earth's response to the fundamental sweep of the shot associated with the listening period. Vibrator deconvolution theory is based on knowing the content of the fundamental sweep as this provides a measurement of the earth's response. If it is possible to estimate also the harmonic output of the vibrator, then it is possible to estimate the harmonic contribution to the preceding shot by convolving the earth's response, as determined from the content of the fundamental sweep, with the harmonic output of the vibrator. Once the harmonic contribution to the preceding shot has been found in this way, it is possible to subtract it from the recorded data.

In principle, it would be possible to use measurements on the seismic energy emitted at the vibrator to estimate the harmonic output of the vibrator. However, the effects of the non-linearity of the earth's behaviour near the vibrator can mean that the harmonic noise at the receiver differs from the harmonic noise that would be estimated from measurements on the vibrator. Estimating the harmonic output from the data itself is therefore a more reliable method.

One embodiment of a method for eliminating harmonic noise from data acquired in the simultaneous slip-sweep acquisition technique or FIG. 3 will now be described with reference to FIG. 4.

Initially, at step 1, vibrator sources are grouped into two or more groups. This grouping step may be a physical grouping step, for example during the deployment of the vibrators. Alternatively it may consist of defining notional groups in a vibrator array. At least one of the groups contains two or more vibrators.

At step 2, simultaneous slip-sweep data are acquired using an acquisition technique of the type described generally with respect to FIG. 3.

At step 3, the impulse response is calculated for each group, from the positions of the vibrators in that group. This step may be carried out in a conventional manner using cross-correlation and an inversion matrix that is constant with frequency, or it may alternatively be done in the manner described in GB-A-2 359 363.

Next, at step 4, the acquired data are cross-correlated with a harmonic frequency sweep.

The sweep that is used in this cross-correlation step is essentially the same as the fundamental sweep of the vibrator, except that it has a sweep rate that is an integer multiple of the sweep rate of the fundamental sweep. Thus, the sweep used in the cross-correlation step would have twice the sweep rate of the fundamental vibrator sweep if it is desired to remove the second harmonic, would have three times the sweep rate of the fundamental sweep for removing the third harmonic, and so on. It is not necessary for the sweep used in the cross-correlation step to extend above the upper frequency limit of the fundamental sweep—and in any case the upper frequency should not exceed the Nyquist frequency for the sampling—so a taper is applied to the harmonic sweep after a frequency near the upper frequency of the fundamental sweep. For each harmonic, the same harmonic sweep may be used in the cross-correlation step for all receivers and for all shots.

The effect of the cross-correlation step is to concentrate in time the earth's response to one harmonic. The earth's response to other harmonics and to the fundamental frequency are spread out in time. In particular, although the earth's response to the fundamental sweep frequency will still be the main contributor to the acquired data, the effect of the cross-correlation step is that it will now arrive at a later time in the records.

At step 5, the cross-correlated data is Fourier transformed over a time window that includes the main first arrival due to the desired harmonic, but which ends before the earth's response to the fundamental vibrator frequency is seen or (in the case of estimating higher harmonics) when the earth's response to a higher amplitude harmonic is seen. The time window length used in this step may vary from one receiver to another. For each frequency and receiver, the result of the Fourier transform is a vector $G_n$ having length N, where N is the number of shots. This vector is the early part of the earth's response to the chosen vibrator harmonic.

At step 6, the impulse response for each receiver and vibrator position is treated with a Fourier transform of the same length as in step 5. The Fourier transform is carried out over the same time window, or a slightly shorter time window, than the Fourier transform in step 5. The results of this Fourier transform step are a vector $R_n$ for each receiver and frequency, with $R_n$ having a length M where M is the number of vibrator positions.

At step 7, the matrix $G_n R^*_n$ is calculated for each frequency and receiver. $R^*_n$ is the complex conjugate of the transpose of $R_n$. This yields an N×M matrix. This matrix is then averaged over receivers to give the cross-correlation matrix $<G_n R^*_n>$. A receiver-based normalisation may be applied in this averaging process, to allow for the varying signal amplitude at different receivers.

At step 8 the M×M matrix $R_n R^*_n$ is calculated for each frequency and receiver. This is then averaged over receivers to give the auto-correlation matrix $<R_n R^*_n>$. If a receiver-based normalisation was applied in step 7, the same normalisation should be applied in step 8.

In step 9 the estimate of the $n_{th}$ harmonic $H_n$ emitted by the vibrator is determined. In principle $H_n$ is given by $H_n = <G_n R^*_n><R_n R^*_n>^{(-1)}$. However, in practice the auto-correlation matrix will be badly conditioned—that is the smallest eigenvalue will be much smaller than the largest eigenvalue, and taking an exact inverse runs the risk of being dominated by noise. A standard singular value decomposition of $<R_n R^*_n>$ decomposes it into the product of three matrices, U, V, and $\Lambda$, where $<R_n R^*_n>=U \Lambda V^*$, U and V are such that $UU^*=VV^*=I$ where I is the identity matrix) and $\Lambda$ is diagonal and real. U and V are the matrices of right and left eigenvectors respectively, $\Lambda$ is composed of the eigenvalues. The true inverse matrix is given by $V\Lambda^{-1}U^*$. The estimate of $H_n$ is given by $H_n=<G_n R^*_n>(VLU^*)$ where L is a diagonal matrix, identical to $\Lambda^{(-1)}$, except the smallest elements have been replaced by zeros. One way of deciding how many eigenvalues to retain and how many to set to zero comes from comparing the root-mean-square (rms) size of the elements of $<R_n R^*_n>$. The rms size of the elements of $VLU^*$ times the rms size of $<R_n R^*_n>$ should be of order 1. Often only one eigenvalue is necessary. $H_n$ is an N by M matrix for each frequency and set of shots.

At step 10 the matrix $H_n$ is Fourier transformed back to the time domain to obtain $h_n$. The Fourier transform is carried out for a time window around T=0 using a smooth taper, and having a half width of around 0.25 seconds or less.

At step 11, $h_n$ is convolved with the harmonic sweep used in step 4. The result of this convolution is the estimate of the vibrator output for the $n^{th}$ harmonic. This is an estimate of the noise that appears on the data acquired during the preceding shot. The data acquired for the preceding shot can be corrected for the harmonic noise, for example by subtracting the harmonic noise estimated from the raw data acquired at the receiver. Alternatively, if the deconvolution stage is performed on correlated data, the harmonic noise can be correlated with the appropriate pilot sweep and then subtracted from the appropriate correlated records.

The above steps may be repeated for each harmonic which it is desired to remove. Typically, the second and third harmonics have the greatest amplitude, so that removal of just these harmonics may be sufficient.

At step 12 the shot records, which have now had the harmonic noise removed, are separated into their individual shot point components. This step may be done on either uncorrelated or correlated shot records. Alternatively, the separation stage can be carried out on the summed noise estimates alone, and these separated noise estimates are then subtracted from previous calculated individual shot point components.

The above method has been described with reference to the simultaneous sub-sweep acquisition method of FIG. 3. It may alternatively be applied to a conventional slip-sweep acquisition method of the type shown in FIG. 2. The method can be simplified when applied to such a conventional slip-sweep technique, since the cross-correlation and the auto-correlation are not matrixes, but are a number at each frequency. Thus, in step 9 the true inverse of the auto correlation can be used.

Use of this method requires a certain minimum time between sweeps. In order to remove the $n^{th}$ harmonic, the minimum time between consecutive sweeps is given by:

$$T_{min} = \frac{(n-1)f_1 S}{n(f_1 - f_0)} \quad (1)$$

This assumes that the fundamental sweep varies linearly between frequency $f_0$ and frequency $f_1$ and has a sweep time of S.

Thus, to remove the second harmonic the slip between consecutive sweeps (for example, T1–T0 in FIG. 2 or FIG. 3) must be slightly more than half the overall sweep duration, to remove the third harmonic it must be slightly more than two thirds of the sweep time, etc.

Figure 4:
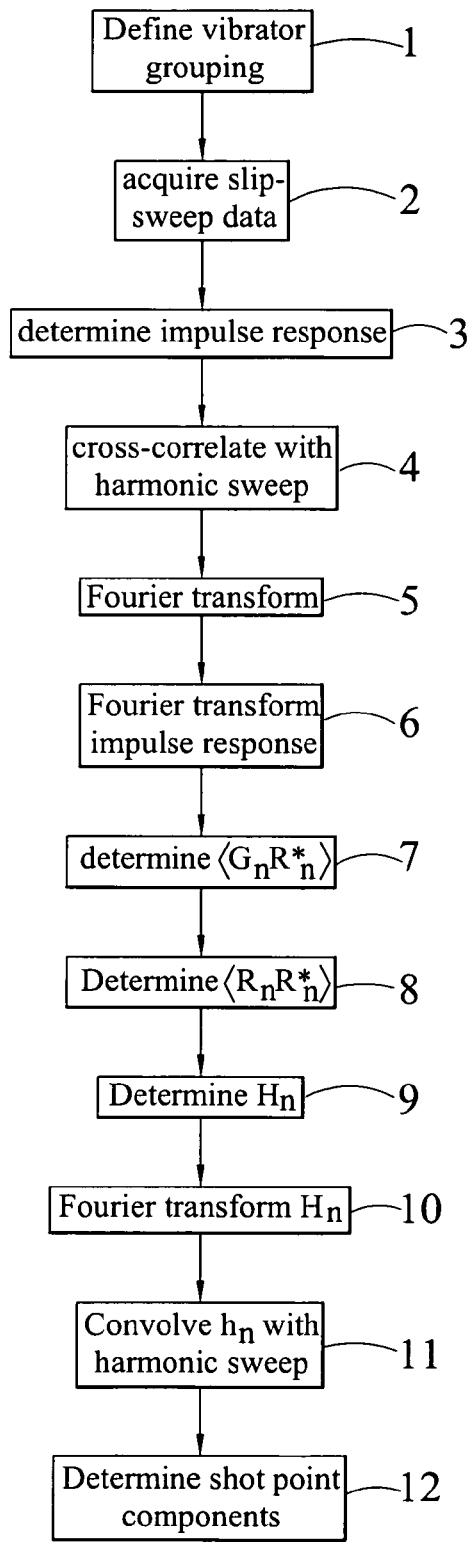
FIG. 4 is a block schematic flow diagram of one embodiment of the present invention.
Figure 5:
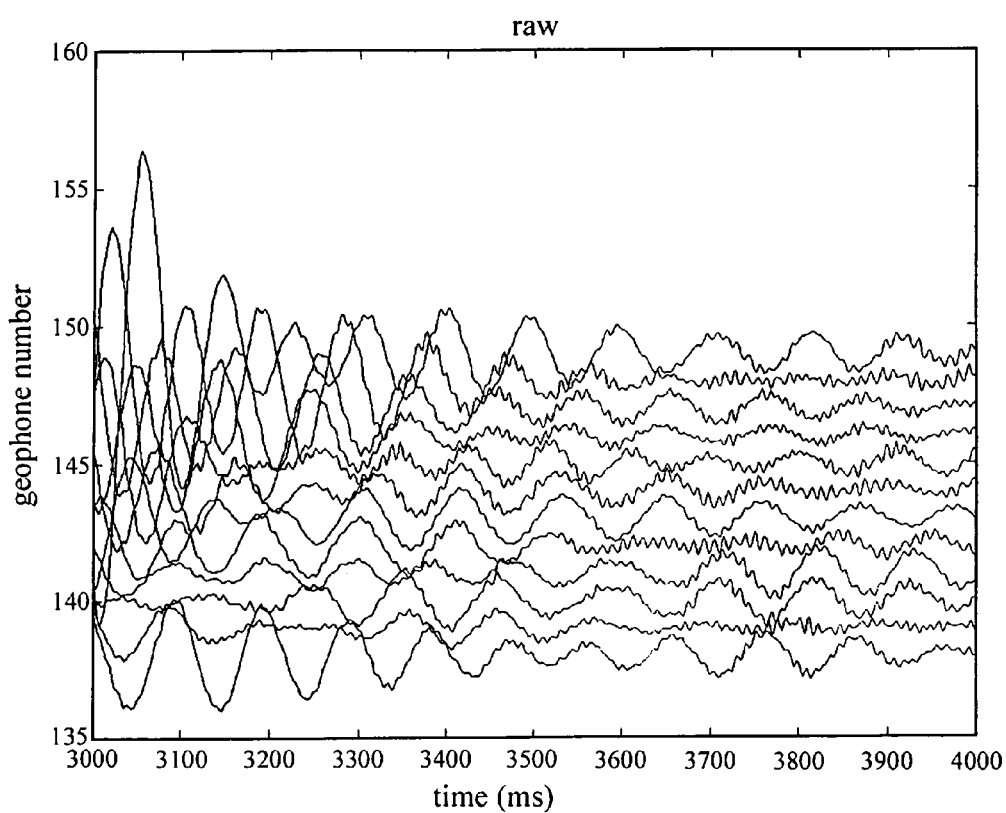
FIG. 5 is a schematic illustration of raw seismic data.
Figure 6:
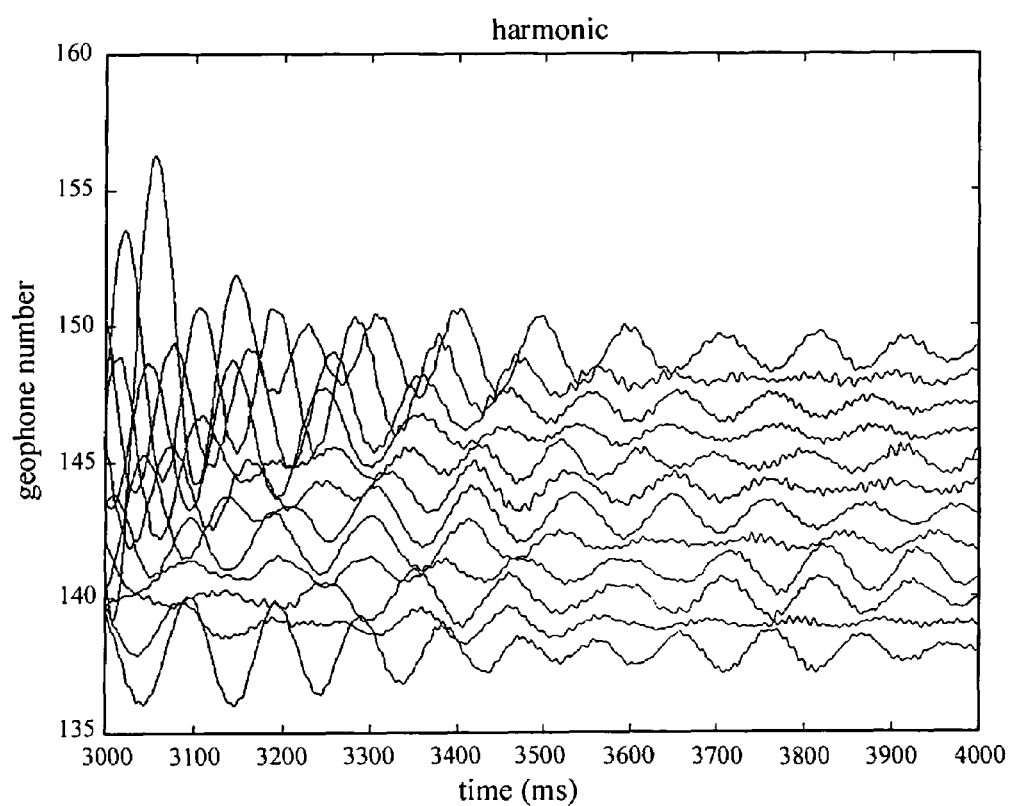
FIG. 6 illustrates the result of processing the raw seismic data of FIG. 5 according to a first method of the present invention.

FIGS. 5 and 6 illustrate results of the method of FIG. 4. FIG. 5 shows part of a data record acquired at a receiver during simultaneous actuation of three seismic vibrators, with each vibrator being actuated four times. Although the data was acquired with a conventional simultaneous acquisition technique, rather than a simultaneous slip-sweep acquisition technique, the records were summed to simulate data acquired by a simultaneous slip-sweep technique of the present invention. It will be seen that there is high frequency harmonic noise across much of the data. The twelve traces shown in FIG. 5 were acquired at twelve separate receiver locations.

FIG. 6 illustrates the result of applying a harmonic estimation and removal method of the type described with reference to FIG. 4 to the second and third harmonics in the data of FIG. 5. It can be seen that the high frequency harmonic noise has been significantly reduced.

An alternative technique for removing harmonic energy will now be described. In contrast to the above-described method of harmonic noise reduction, which relies on being able to estimate the harmonic noise, the technique described below requires very little knowledge of the harmonic energy. The method requires only knowledge of at which time different orders of harmonic energy arrives at a receiver. This method may be applied to both the simultaneous slip-sweep acquisition of FIG. 3 or to conventional slip-sweep acquisition of seismic data. One restriction on this technique is that there must be at least one more sweep made than the number of shot points that are being separated. Thus, for standard slip-sweep data acquisition each vibrator must be actuated at least twice in each shot location. In a simultaneous slip-sweep acquisition technique in which each group includes two vibrators, at least three sweeps must be made in each location.

Consider initially the case of a standard slip-sweep acquisition technique in which each vibrator group makes two shots in each location. After cross-correlation or deconvolution the signal components of the data record for one shot will be the same as the signal component of the data record for the other shots. If the harmonic noise component in the two records can be arranged to differ, then it is possible to reduce or eliminate the harmonic noise by combining the two records appropriately. One way of doing this that has been proposed previously is to vary the phase of the shots. If the phase of the $n^{th}$ harmonic is n times greater than the phase of the fundamental sweep (which is usually approximately true), then by choosing an appropriate phase difference and summing the records after cross-correlation, one or more harmonics will cancel out. If the two shots are 90° out of phase then the third harmonic will cancel. If the two shots are 180° out of phase then the second and fourth harmonics will cancel. If there are three shots, each being 120° out of phase with the other two shots, then the second and third harmonics will cancel.

The method described below uses a combination of an acquisition technique and a processing technique, and does not depend on any algebraic phase relation.

The method described below is based on the principle that, if harmonic noise on one shot appears at a different time from harmonic noise on another shot, then appropriate stacking can eliminate or substantially reduce the noise. The stacking method that is used is time-frequency diversity stacking. This stacking method works well when the signal component of the two records is the same, but the noise appears in different locations in the time-frequency domain.

To make harmonic noise appear at different times in different shots, one method is to vary the delay between shots. The chosen time difference between a shot in one location and the subsequent shot (at another location) should differ from the time delay between another shot made in the first location and subsequent shot thereto such that, after time-frequency decomposition, the largest peaks in the noise do not substantially overlay one another. The exact time delay that is required will depend on the sweep rate, but it has been found that a difference of between 1 and 2 seconds is generally sufficient if the sweep time is less than 10 seconds.

In a variation of this technique the effect of the time delay between shots is mimicked using multiple vibrator groups where the noise is arranged to come from shots from different, widely separated vibrator groups. The spatial separation between the vibrator groups will induce a time delay so that, for most receivers, harmonic noise will arrive at different times and time-frequency diversity stacking will be effective at removing the harmonic noise. For some receivers, the peaks in the noise from different shots will overly one another, but this noise can be removed during stacking using the technique disclosed in UK patent application No 2 359 363.

In the case of N vibrators, it is necessary to make at least (N+1) shots of encoded sweeps, from which the n individual shot records can be extracted. For example, consider two groups of two vibrators each with a sweep time S of 8 seconds and a listening time L of 5 seconds. The fastest that these vibrators can perform three shots for each group is as follows:

TABLE 1

| | | |
|---|---|---|
| Group 1 shot 1 starts 0 seconds | | |
| | Group 2 shot 1 starts 5 seconds | 5 second time slip |
| Group 1 shot 1 ends 8 seconds | | |
| Group 1 shot 2 starts 10 seconds | | |
| | Group 2 shot 1 ends 13 seconds | 5 second slip time |
| | Group 2 shot 2 starts 15 seconds | 5 second slip time |
| Group 1 shot 2 ends 18 seconds | | |
| Group 1 shot 3 starts 20 seconds | | |
| | Group 2 shot 2 ends 23 seconds | 5 second slip time |
| | Group 2 shot 3 starts 25 seconds | 5 second slip time |
| Group 1 shot 3 ends 28 seconds | | |
| | Group 2 shot 3 ends 33 seconds | 5 second slip time |

Adding delays between the shots made by the first group and the shot that follows each shot of the first group enables the harmonic noise to be placed at different times in the shot records. For example, the above shot scheme can be modified by increasing the delay between a shot of the first group and the corresponding shot of the second group, as follows:

TABLE 2

| | | |
|---|---|---|
| Group 1 shot 1 starts 0 seconds | | |
| | Group 2 shot 1 starts 5 seconds | 5 second time slip |
| Group 1 shot 1 ends 8 seconds | | |
| Group 1 shot 2 starts 10 seconds | | |
| | Group 2 shot 1 ends 13 seconds | 5 second slip time |
| | Group 2 shot 2 starts 16 seconds | 6 second slip time |
| Group 1 shot 2 ends 18 seconds | | |
| Group 1 shot 3 starts 22 seconds | | |
| | Group 2 shot 2 ends 24 seconds | 6 second slip time |
| | Group 2 shot 3 starts 29 seconds | 7 second slip time |
| Group 1 shot 3 ends 30 seconds | | |
| | Group 2 shot 3 ends 37 seconds | 7 second slip time |

In this modified shot scheme of Table 2, the varying delay between a shot of the first group and the corresponding shot of the second group means that harmonic noise will appear at different times in the shot records. It is therefore possible to eliminate the harmonic noise using the "diversity simultaneous inversion technique" disclosed in GB 2 359 363.

Figure 7:
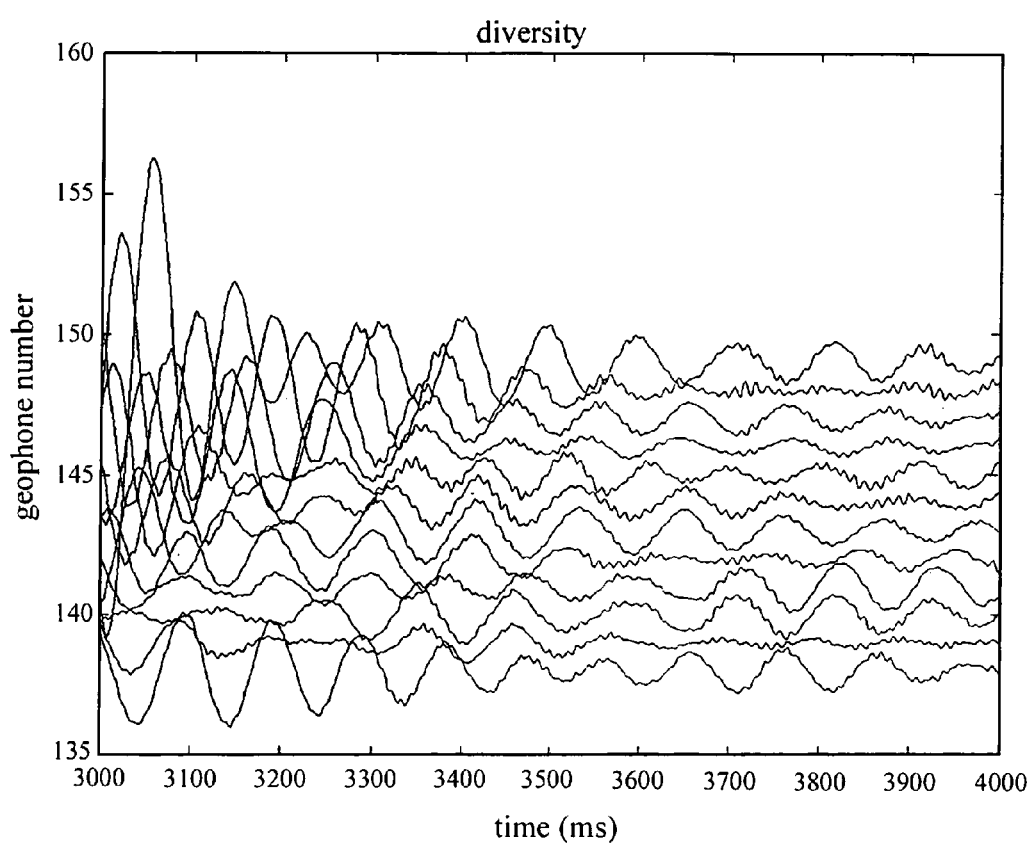
FIG. 7 illustrates the results of processing the seismic data of FIG. 5 according to a second method of the present invention.

FIG. 7 illustrates the results of applying the diversity simultaneous inversion technique to the data shown in FIG. 5. It will again be seen that a considerable reduction in harmonic noise has been provided.

In the shot scheme of table 2, the time delay between a shot of the first vibrator group and the corresponding shot of the second vibrator group increases with the shot number. The invention is not limited to this, and the time delay between a shot of the first vibrator group and the corresponding shot of the second vibrator group could alternatively decrease with the shot number.

The technique of diversity simultaneous inversion may be combined with harmonic estimation and removal for those shots where the time delay satisfies equation (1) above. For example, if the vibrator sweep is from 10 Hz to 100 Hz, then the second harmonic can be estimated and removed if the slip time is greater than 4.5 seconds, the third harmonic can be estimated and removed if the slip time is more than 6 seconds, and the fourth harmonic can be removed if the slip time is more than 6.7 seconds. Thus, for the acquisition scheme of Table 2, the second harmonic may be estimated and removed from the harmonic noise in all shots, the third harmonic may be estimated and removed from the noise in the second and third shot of each group, and the fourth harmonic may be estimated and removed from the noise in the third shot of each group.

Figure 8:
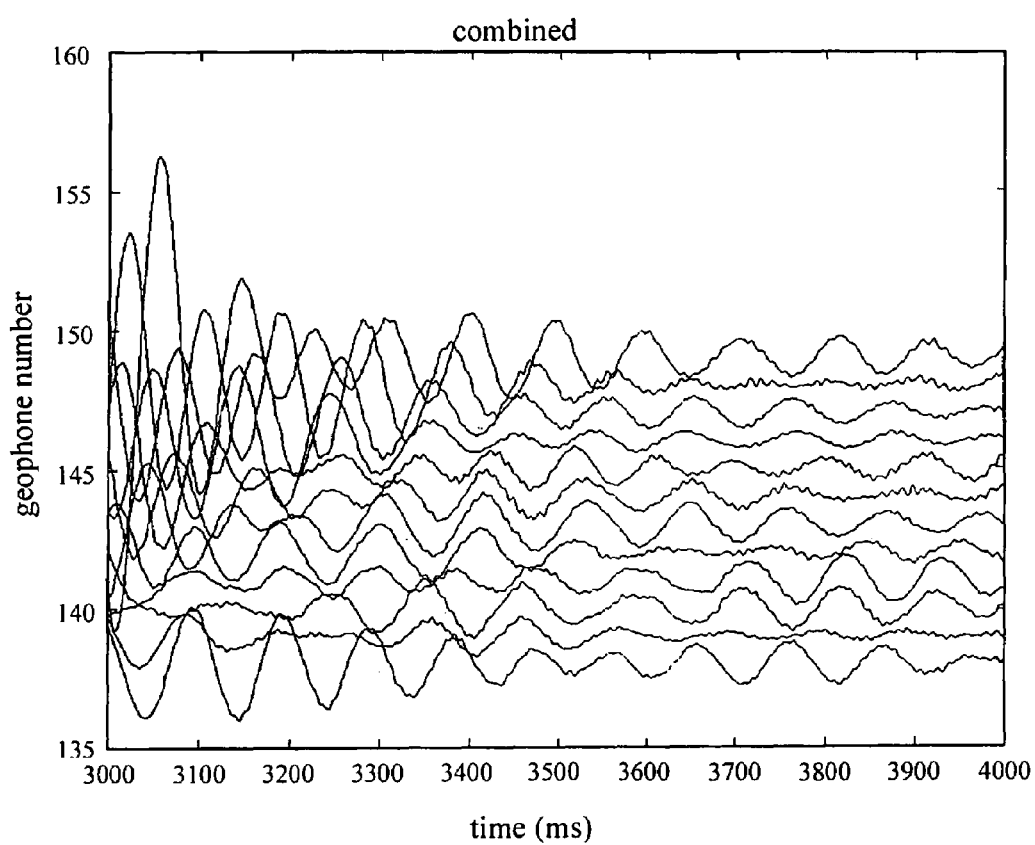
FIG. 8 shows the result of processing the seismic data of FIG. 5 according to the first and second methods of the invention.

FIG. 8 illustrates the results of applying both the harmonic estimation and removal technique and the diversity simultaneous inversion technique. FIG. 8 shows the results of carrying out the diversity simultaneous inversion technique to the data shown in FIG. 6—which has already undergone a harmonic estimation and removal technique for the second and third harmonics. It will be seen that subsequent application of the diversity simultaneous inversion technique has resulted in further reduction in noise.

The manner in which the above techniques are used depends on factors such as the number of groups, the time required to move a vibrator from one desired shooting position to another, and the ratio of the total vibrator sweep time to the listen time.

If the listen time is equal to the total sweep time divided by the number of vibrators in a group, then an efficient implementation is to have two groups. At any one time, one group can be being re-positioned while the other group is acquiring data. The group that is acquiring data shoots the same number of shots as there are vibrators in the group. Each vibrator sweeps nearly continuously, with only a short pause at the end of each sweep to reset the equipment. When the first group has finished shooting, the second group is in position, and begins shooting while the first group moves up to the next location. The slip time is 100% of the sweep time, so harmonic estimation and removal may be applied to the acquired data. However, as the number of shots is equal to the number of vibrators in each group, diversity-simultaneous inversion is not possible.

If, in another example, the sweep time for each vibrator is around twice the listening time, then a method using three groups can usefully be employed. In the case of nine vibrators, it will be possible to have three groups of three vibrators, with vibrators in each group being actuated four time with varying delays between shots. The shooting pattern would be arranged so that the first two shots of each group alternate with the last two shots of the preceding group and so that the third and fourth shots of each group alternate with the first two shots of the subsequent group. For those shots where equation (1) is satisfied, harmonic noise can be estimated and removed. Diversity simultaneous inversion may then be applied to the acquired data for each group.

FIG. 9(a) is a schematic illustration of a seismic surveying arrangement according to an embodiment of the invention. The seismic surveying arrangement comprises a plurality of vibrators 1,2,3,4 and a control means 5. Two groups of vibrators A, B are defined in FIG. 9(a), with each group containing two vibrators in each group, but the seismic surveying arrangement of the invention is not limited to this particular number of groups or to this number of vibrators in a group. The control means 5 is able to actuate each group independently of the other group. For example, the control means may be electrically connected to each group of vibrators so that it can send an electrical signal to a selected group to actuate each vibrator in the selected group. The control means is adapted to actuate the vibrators according to, for example, a "simultaneous slip-sweep" method of the type described with reference to FIG. 3 or a "varying time delay" method of the type described with reference to Table 2.

Four vibrators are shown in FIG. 9(a), arranged into two groups each containing two vibrators but a seismic surveying arrangement the invention is not limited to these numbers of vibrators and groups. A seismic surveying arrangement of the invention for use with the "simultaneous slip-sweep" method may contain two or more independently actuable groups of vibrators, with at least one group containing more than one vibrator. A seismic surveying arrangement of the invention for use with the "varying time delay" method may contain two or more independently actuable groups of vibrators, or alternatively may contain two or more independently actuable vibrators.

The seismic surveying arrangement of FIG. 9(a) further comprises an array of one or more seismic receivers (two receivers 6,7 are shown in FIG. 9(a), but the seismic surveying arrangement is not limited to two receivers).

FIG. 9(b) is a schematic block diagram of the control means 5. The control means comprises a programmable data processor 8 with a program memory 9, for instance in the form of a read only memory ROM, storing a program for controlling the control means 5 to actuate the vibrators 1,2,3,4 according to, for example a method as illustrated in FIG. 3 or Table 2 or as defined by equation (1) above. The system further comprises non-volatile read/write memory 10 for storing, for example, any data which must be retained in the absence of power supply. A "working" or "scratchpad" memory for the data processor is provided by a random access memory (RAM) 11. An input interface 12 is provided, for instance for receiving commands and data. An output interface 13 is provided, for instance for outputting actuation signals to a selected receiver or to a selected group of receivers. A program defining the actuation sequence of the receivers or receiver groups may be supplied via the input interface 12 or may alternatively be provided by a machine-readable store 14.

The program for operating the control means and for performing the method described hereinbefore is stored in the program memory 9, which may be embodied as a semi-conductor memory, for instance of the well-known ROM type. However, the program may be stored in any other suitable storage medium, such as magnetic data carrier 9a (such as a "floppy disc") or CD-ROM 9b.

The present invention is applicable to both land-based vibrator sources of seismic energy and the marine vibrator sources of seismic energy.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of seismic surveying comprising the steps of:
actuating the or each vibrator in a first vibrator group at time T0; and
actuating the or each vibrator in a second vibrator group at time T1, where T0<T1<T0+S1+L where S1 is the sweep time of the first vibrator group and L is the listening time and wherein T1−T0<(n−1) S1 $f_0$/n($f_1$−$f_0$), where n is a natural number, $f_0$ is the lower frequency limit of the vibrator sweep and $f_1$ is the upper frequency limit of the vibrator sweep;
wherein at least one of the first vibrator group and the second vibrator group comprises at least two vibrators.

2. A method as claimed in claim 1 wherein the second vibrator group is the first vibrator group.

3. A method of seismic surveying as claimed in claim 1, further comprising the step of actuating the or each vibrator group at least as many times as there are vibrators in the respective group and such that the contribution from each vibrator in a group may be determined by algebraic operation on receiver records of sweeps made by the respective group.

4. A method as claimed in claim 1, comprising the further step of actuating the or each vibrator in a third vibrator group at time T2, where T1<T2<T1+S2+L where S2 is the sweep time of the second vibrator group.

5. A method as claimed in claim 1, further comprising estimating from the acquired data the noise in the acquired data owing to the $m^{th}$ harmonic, where m≦n.

6. A method as claimed in claim 1, further comprising the steps of
actuating the or each vibrator in the first vibrator group at time T2, where T1<T2<T1+S2+L where S2 is the sweep time of the second vibrator group; and
actuating the or each vibrator in the second vibrator group at time T3 where T2<T3<T2+S1+L;
wherein the first vibrator group is different from the second vibrator group; and wherein T3−T2≠T1−T0.

7. A method as claimed in claim 6 wherein the $j^{th}$ vibrator group contains $N_j$ vibrators and is actuated $N_j$+1 times.

8. A method of seismic surveying comprising the steps of:
actuating a first vibrator at time T0;
actuating a second vibrator different from the first vibrator at time T1, where T0<T1<T0+S1+L where S1 is the sweep time of the first vibrator and L is the listening time;
actuating the first vibrator at time T2, where T1<T2<T1+S2+L where S2 is the sweep time of the second vibrator; and
actuating the second vibrator at time T3 where T2<T3<T2+S1+L and where T3−T2≠T1−T0.

9. A method as claimed in claim 8 wherein T3−T2>T1−T0.

10. A seismic surveying arrangement comprising:
a plurality of vibrators; and
a control means adapted to actuate the or each vibrator in a first vibrator group at time T0 and to actuate the or each vibrator in a second vibrator group at time T1, where T0<T1<T0+Si+L where S1 is the sweep time of the first vibrator group and L is the listening time and adapted to actuate the first and second groups of vibrators such that T1−T0>(n−1) S1 $f_0$/n ($f_1$−$f_0$), where n is a natural number, $f_0$ is the lower frequency limit of the vibrator sweep and $f_1$ is the upper frequency limit of the vibrator sweep.

11. A seismic surveying arrangement as claimed in claim 10 wherein the control means is adapted to actuate the or each vibrator group at least as many times as there are vibrators in the respective group and such that the contribution from each vibrator in a group may be determined by algebraic operation on receiver records of sweeps made by the respective group.

12. A seismic surveying arrangement as claimed in claim 10 or 11 wherein the first vibrator group is different from the second vibrator group; and wherein the control means is further adapted to actuate the or each vibrator in the first vibrator group at time T2, where T1<T2<T1+S2+L where S2 is the sweep time of the second vibrator group and to actuate the or each vibrator in the second vibrator group at time T3 where T2<T3<T2+S1+L and where T3−T2≠T1−T0.

13. A seismic surveying arrangement as claimed in claim 10, further comprising a processor for estimating from acquired data noise in the acquired data owing to the $m^{th}$ harmonic, where $m \leq n$.

14. A seismic surveying arrangement comprising:
   a plurality of vibrators; and
   a control means adapted to:
   a) actuate a first vibrator at time T0;
   b) actuate a second vibrator different from the first vibrator at time T1, where T0<T1<T0+S1+L where S1 is the sweep time of the first vibrator and L is the listening time;
   c) actuate the first vibrator at time T2, where T1<T2<T1+S2+L where S2 is the sweep time of the second vibrator; and
   d) actuate the second vibrator at time T3 where T2<T3<T2+S1+L and where T3−T2≠T1−T0.

15. A seismic surveying arrangement as claimed in claim 14 and adapted to actuate the second vibrator group at time T3 where T3−T2>T1−T0.

16. A seismic surveying arrangement as claimed in claim 14 wherein the control means comprises a programmable data processor.

17. A storage medium containing a program for the data processor of a seismic surveying arrangement as defined in claim 16.

* * * * *

UNITED STATES PATENT AND TRADEMARK OFFICE
CERTIFICATE OF CORRECTION

PATENT NO. : 7,050,356 B2 Page 1 of 1
APPLICATION NO. : 10/403135
DATED : May 23, 2006
INVENTOR(S) : Benjamin Peter Jeffryes It is certified that error appears in the above-identified patent and that said Letters Patent is hereby corrected as shown below:

Column 13:

Line 67, "listening time and wherein $T1 - T0 < (n-1) S1 f_0 / n (f_1 -$"

should be replaced with

-- listening time and wherein $T1 - T0 > (n-1) S1 f_0 / n (f_1 -$ --

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,050,356 B2  Page 1 of 1
APPLICATION NO. : 10/403135
DATED : May 23, 2006
INVENTOR(S) : Benjamin Peter Jeffryes It is certified that error appears in the above-identified patent and that said Letters Patent is hereby corrected as shown below:

Column 3:

Line 47, "In a preferred embodiment T1-T0>(n-1) S1 $F_0/n(f_1 - f_0)$,"

should be replaced with

-- In a preferred embodiment T1-T0>(n-1) S1 $f_1/(n(f_1 - f_0))$ --;

Column 14:

Line 1, "$f_0$), where n is a natural number, $f_0$ is the lower"

should be replaced with

-- $f_0$)), where n is a natural number, $f_0$ is the lower --;

Line 54, "vibrators such that T1-T0>(n-1) S1 $f_0/n(f_1 - f_0)$, where"

should be replaced with

--vibrators such that T1-T0>(n-1) S1 $f_1/(n(f_1 - f_0))$, where --

Signed and Sealed this

Twenty-ninth Day of April, 2008

JON W. DUDAS
*Director of the United States Patent and Trademark Office*